United States Patent
Sato et al.

(10) Patent No.: US 10,311,735 B2
(45) Date of Patent: Jun. 4, 2019

(54) VEHICLE DISPLAY SYSTEM AND METHOD OF CONTROLLING VEHICLE DISPLAY SYSTEM

(71) Applicant: SUBARU CORPORATION, Tokyo (JP)

(72) Inventors: Noeru Sato, Tokyo (JP); Takeshi Torii, Tokyo (JP); Ryuichi Sumikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/898,265

(22) Filed: Feb. 16, 2018

(65) Prior Publication Data

US 2018/0268701 A1    Sep. 20, 2018

(30) Foreign Application Priority Data

Mar. 15, 2017    (JP) ................................. 2017-050347

(51) Int. Cl.
| | | |
|---|---|---|
| *B60Q 1/00* | (2006.01) | |
| *G08G 1/16* | (2006.01) | |
| *B60K 35/00* | (2006.01) | |
| *B60Q 1/50* | (2006.01) | |
| *G02B 27/01* | (2006.01) | |

(52) U.S. Cl.
CPC ............. *G08G 1/166* (2013.01); *B60K 35/00* (2013.01); *B60Q 1/50* (2013.01); *G02B 27/0101* (2013.01); *G08G 1/167* (2013.01); *B60K 2350/1096* (2013.01); *B60K 2350/962* (2013.01); *B60K 2350/965* (2013.01); *B60R 2300/205* (2013.01);

(Continued)

(58) Field of Classification Search
CPC .................... G08G 1/166; B60K 35/00; B60K 2350/1096; B60K 2350/962; B60K 2350/965; B60K 2300/205; B60K 2300/802; B60K 2300/8066; B60Q 1/50; G02B 27/0101
USPC ......................................................... 340/438
See application file for complete search history.

(56) References Cited

U.S. PATENT DOCUMENTS 6,124,647 A  *   9/2000  Marcus ............... B60C 23/0401
                                                      307/10.1
9,845,043 B1 *  12/2017  Webb ...................... B60Q 1/28
(Continued)

FOREIGN PATENT DOCUMENTS

| JP | 2001-18717 A | 1/2001 |
|---|---|---|
| JP | 2010-023769 A | 2/2010 |

(Continued)

OTHER PUBLICATIONS

Japanese Office Action issued in corresponding Japanese Patent Application No. 2017-050347, dated Oct. 9, 2018, with English Translation.

*Primary Examiner* — Zhen Y Wu
(74) *Attorney, Agent, or Firm* — McDermott Will & Emery LLP

(57) ABSTRACT

A vehicle display system includes a display device, a determiner, and a display controller. The display device is mounted on a vehicle. The determiner is configured to determine whether a person present outside the vehicle enters a blind spot of a driver of the vehicle. The display controller is configured to control, when the person enters the blind spot, the display device to display a warning to the person.

11 Claims, 6 Drawing Sheets

(52) U.S. Cl.
CPC . *B60R 2300/802* (2013.01); *B60R 2300/8066* (2013.01)

(56) References Cited

U.S. PATENT DOCUMENTS

| | | | | |
|---|---|---|---|---|
| 9,987,978 | B1* | 6/2018 | Bontrager | B60Q 1/503 |
| 2005/0007645 | A1* | 1/2005 | Tonar | B60Q 1/2665 |
| | | | | 359/265 |
| 2009/0115631 | A1* | 5/2009 | Foote | B60Q 1/2665 |
| | | | | 340/901 |
| 2010/0023234 | A1 | 1/2010 | Kameyama | |
| 2010/0201508 | A1* | 8/2010 | Green | B60Q 9/008 |
| | | | | 340/435 |
| 2012/0025964 | A1* | 2/2012 | Beggs | B60Q 1/2673 |
| | | | | 340/435 |
| 2012/0044090 | A1* | 2/2012 | Kahler | B60Q 1/50 |
| | | | | 340/905 |
| 2012/0191298 | A1* | 7/2012 | Schwarzhaupt | B60Q 1/22 |
| | | | | 701/36 |
| 2012/0229882 | A1* | 9/2012 | Fish, Jr. | B60R 1/025 |
| | | | | 359/267 |
| 2013/0043990 | A1* | 2/2013 | Al-Jafar | B60Q 1/2665 |
| | | | | 340/439 |
| 2013/0141931 | A1* | 6/2013 | Mathieu | B60Q 1/34 |
| | | | | 362/516 |
| 2014/0218213 | A1* | 8/2014 | Schneider | G08G 1/167 |
| | | | | 340/905 |
| 2014/0376119 | A1* | 12/2014 | Sobecki | B60R 1/074 |
| | | | | 359/841 |
| 2015/0232028 | A1* | 8/2015 | Reardon | B60R 1/00 |
| | | | | 348/148 |
| 2015/0350607 | A1* | 12/2015 | Kim | H04N 7/181 |
| | | | | 348/148 |
| 2016/0144785 | A1* | 5/2016 | Shimizu | B60R 11/02 |
| | | | | 340/435 |
| 2016/0171317 | A1* | 6/2016 | Kim | G06T 5/006 |
| | | | | 382/103 |
| 2016/0288644 | A1* | 10/2016 | Bochenek | B60K 35/00 |
| 2017/0039856 | A1* | 2/2017 | Park | B60K 35/00 |
| 2017/0043720 | A1* | 2/2017 | Shaw | B60Q 9/008 |
| 2017/0072855 | A1* | 3/2017 | Kanagaraj | B60R 1/00 |
| 2017/0092134 | A1* | 3/2017 | Kendall | B60R 1/06 |
| 2017/0101058 | A1* | 4/2017 | Park | B60R 1/081 |
| 2017/0132893 | A1* | 5/2017 | Grenn | G08B 21/02 |
| 2017/0190286 | A1* | 7/2017 | Yavitz | B60Q 1/54 |
| 2017/0197544 | A1* | 7/2017 | Wang | G08G 1/096716 |
| 2017/0210282 | A1* | 7/2017 | Rodriguez Barros | G03B 21/00 |
| 2017/0246988 | A1* | 8/2017 | Ihedinmah | B60Q 1/503 |
| 2017/0253181 | A1* | 9/2017 | Choi | B60Q 9/008 |
| 2017/0270374 | A1* | 9/2017 | Myers | B60Q 9/00 |
| 2017/0341576 | A1* | 11/2017 | Lei | B60Q 9/008 |
| 2017/0361764 | A1* | 12/2017 | Salter | F21K 2/005 |
| 2017/0361767 | A1* | 12/2017 | Arceo | B60Q 1/525 |
| 2017/0372609 | A1* | 12/2017 | Kodama | G08G 1/16 |
| 2018/0004020 | A1* | 1/2018 | Kunii | B60Q 1/04 |
| 2018/0056854 | A1* | 3/2018 | Kunii | H04N 9/3185 |
| 2018/0268701 | A1* | 9/2018 | Sato | B60K 35/00 |

FOREIGN PATENT DOCUMENTS

| | | |
|---|---|---|
| JP | 2013-156703 A | 8/2013 |
| JP | 2017-007502 A | 1/2017 |

* cited by examiner

VEHICLE DISPLAY SYSTEM AND METHOD OF CONTROLLING VEHICLE DISPLAY SYSTEM

CROSS-REFERENCE TO RELATED APPLICATIONS

The present application claims priority from Japanese Patent Application No. 2017-050347 filed on Mar. 15, 2017, the entire contents of which are hereby incorporated by reference.

BACKGROUND

The technology relates to a vehicle display system and a method of controlling the vehicle display system.

Japanese Unexamined Patent Application Publication (JP-A) No. 2001-18717 discloses an exemplary device that monitors an area surrounding a vehicle. This device, when detecting a human body at a blind spot, emits a warning sound to the driver.

SUMMARY

An aspect of the technology provides a vehicle display system that includes: a display device mounted on a vehicle; a determiner configured to determine whether a person present outside the vehicle enters a blind spot of a driver of the vehicle; and a display controller configured to control, when the person enters the blind spot, the display device to display a warning to the person.

An aspect of the technology provides a method of controlling a vehicle display system. The method includes: determining whether a person present outside a vehicle enters a blind spot of a driver of the vehicle, in which the vehicle has a display device; and controlling, when the person enters the blind spot, the display device to display a warning to the person.

An aspect of the technology provides a vehicle display system that includes: a display device mounted on a vehicle; and circuitry configured to determine whether a person present outside the vehicle enters a blind spot of a driver of the vehicle, and control, when the person enters the blind spot, the display device to display a warning to the person.

DETAILED DESCRIPTION

Figure 1:
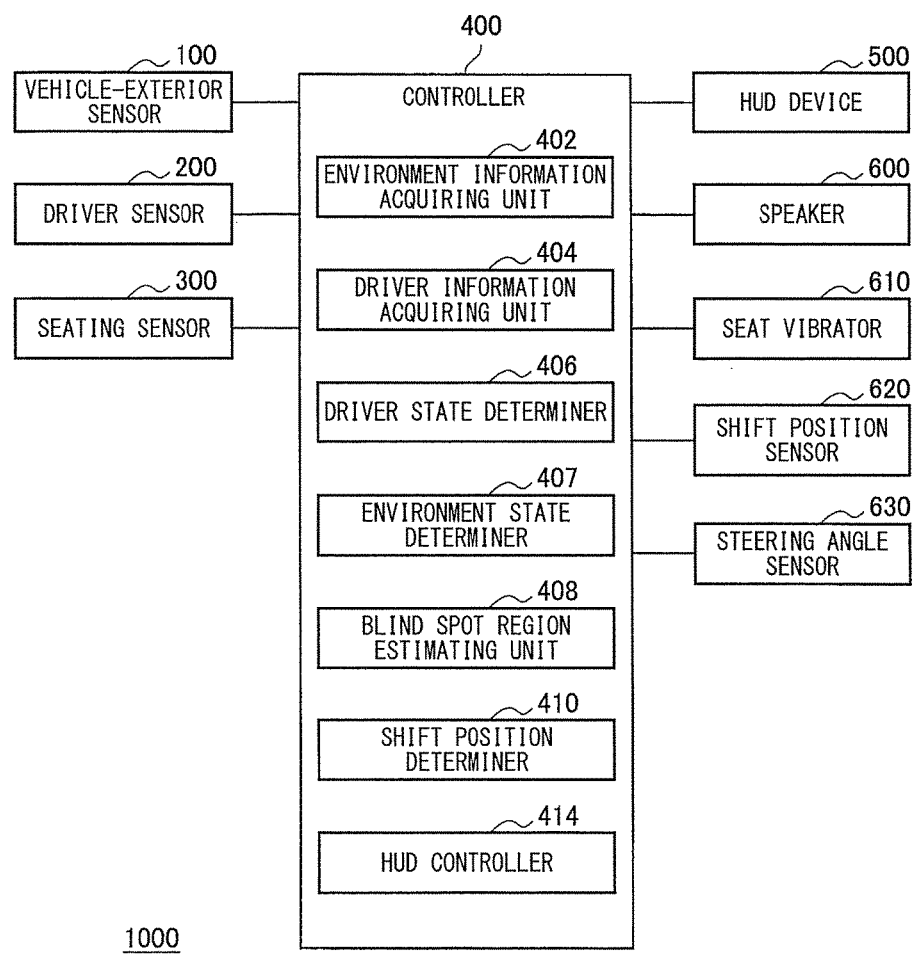
FIG. 1 schematically illustrates an example of a configuration of a vehicle display system according to one implementation of the technology.

A device disclosed in JP-A No. 2001-18717 is adapted simply to give a warning to a driver. Therefore, a person outside a vehicle may have difficulty recognizing that he/she has entered a driver's blind spot.

It is desirable to provide a vehicle display system and a method of controlling the vehicle display system that both make it possible to display a warning to a person who has entered a driver's blind spot.

In the following, some non-limiting implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

A person who is walking outside a vehicle usually believes that a driver of a vehicle has grasped his/her location. In some cases, therefore, the person outside the vehicle tries to pass by the vehicle on the assumption that the vehicle would stop.

If the person outside the vehicle enters a driver's blind spot, however, the driver may fail to grasp his/her location, and thus the person and the vehicle may come close to each other. In this case, there is a possibility of the person coming into contact with the vehicle.

At least one implementation of the technology provides a vehicle display system and a method of controlling the vehicle display system that both make it possible to display a warning to a person that has entered a driver's blind spot.

FIG. 1 schematically illustrates an example of a configuration of a vehicle display system 1000 according to one implementation of the technology. The vehicle display system 1000 may be basically mounted in a vehicle. The vehicle may be, for example but not limited to, an automobile. Referring to FIG. 1, the vehicle display system 1000 may include vehicle-exterior sensors 100, a driver sensor 200, seating sensors 300, a controller 400, a HUD device 500, speakers 600, seat vibrators 610, a shift position sensor 620, and a steering angle sensor 630.

Each of the vehicle-exterior sensors 100 may be a stereo camera, a monocular camera, millimeter wave radar, an infrared sensor, or any other sensing device. Each vehicle-exterior sensor 100 may measure a parameter such as, but not limited to, a position and speed of an object. Non-limiting examples of the object may include a vehicle and a person around the vehicle. In an example implementation, each vehicle-exterior sensor 100 may be a stereo camera that includes a pair of right and left cameras each having an imaging device such as, but not limited to, a charge-coupled device (CCD) sensor or a complementary metal-oxide semiconductor (CMOS) sensor. Then, the stereo camera may capture an image of an environment outside a vehicle and transmit information on the captured image to the controller 400. In an example implementation, the stereo camera may be a color camera disposed on an upper portion of a windshield of the vehicle and be able to acquire color information.

The HUD device 500 may be a display device that displays information directly in a human visual field. More specifically, the HUD device 500 may display a real image on a window such as, but not limited to, the windshield or a rear window of the vehicle. Although a known HUD device typically displays a virtual image, the HUD device 500 in this implementation may be a display device that displays a real image. The HUD device 500 may display a real image at a viewing angle of about 360 degrees, thereby allowing persons inside and outside the vehicle to view the image. In an alternative implementation, however, the HUD device 500 may display a virtual image.

Figure 2:
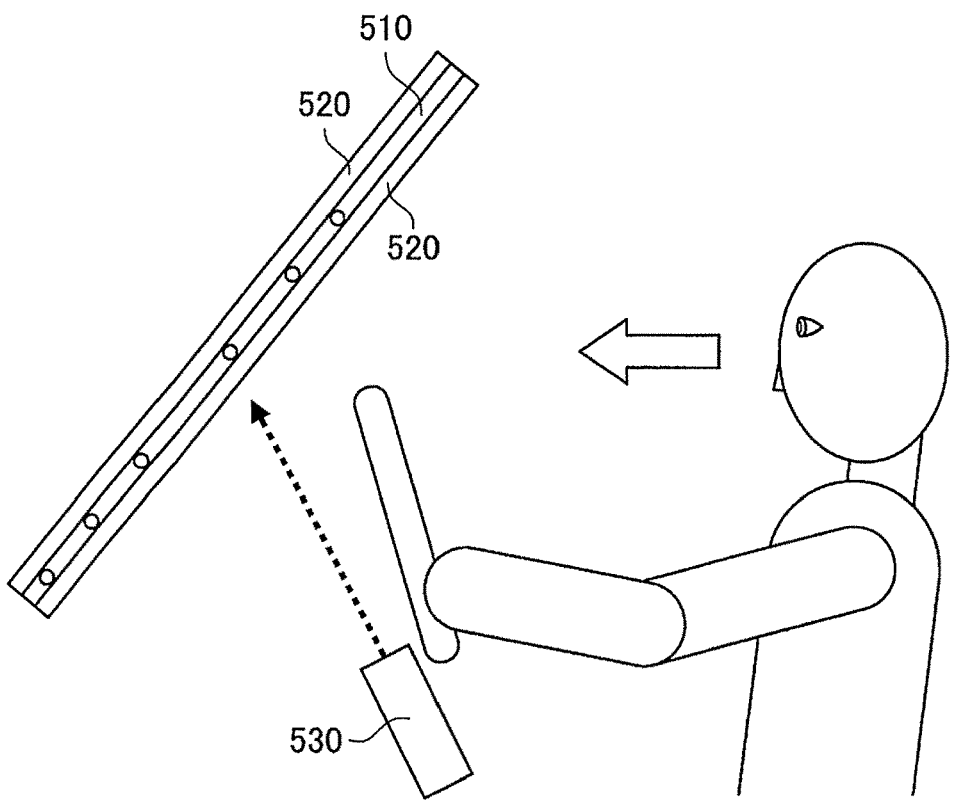
FIG. 2 schematically illustrates an example of a head-up display (HUD) device that includes a self-luminous interlayer film.

In one specific but non-limiting implementation, the HUD device 500 may be a device that includes a self-luminous interlayer film 510, as illustrated in FIG. 2. In such an implementation, the self-luminous interlayer film 510 may be disposed between two sheets of glass 520 in the window of the vehicle 800 such as, but not limited to, the windshield and the rear window. The self-luminous interlayer film 510 may contain a luminescence material. When a portion of the self-luminous interlayer film 510 is irradiated with laser light from a projector 530 mounted in the vehicle, the irradiated portion may emit light, displaying objects, including characters and images. The objects may have visibility at all angles and may be thus viewable not only from the driver seat but also from the other seats as well as any location outside the vehicle. In an alternative implementation, the HUD device 500 may have a configuration in which a self-luminous device is disposed at the window of the vehicle. In such an alternative implementation, the HUD device 500 may have a transparent screen that contains an organic electroluminescence (EL) element, a transmissive liquid crystal device, or any other member that allows for transmissive displaying. In a further alternative implementation, any device other than the HUD device 500 may be used as the display device. In such an alternative implementation, a large-sized liquid crystal display device, a light-emitting diode (LED) display device, or any display device provided on a member such as, but not limited to, an instrument panel may be used as the display device. In the following, a description is given of one implementation in which the HUD device 500 provides a display on the window, such as the windshield and the rear window, of the vehicle. In one implementation, the HUD device 500 may serve as a "display device". The display device according to any implementation of the technology, however, is not limited to the HUD device 500. The term "HUD device" or "display device" according to any implementation of the technology encompasses any and all display devices provided inside and/or outside a vehicle. In an example implementation, the display device may be provided at any external site of the vehicle other than the window, such as a body of the vehicle. In an example implementation, the display device may be provided at any internal site of the vehicle other than the window, such as the instrument panel and a seat. The display devices disposed inside and outside the vehicle may be provided integrally with or separately from each other. Accordingly, the wording "mounted on" the vehicle as used herein and its variants are intended to encompass both an implementation in which the display device is located inside the vehicle and an implementation in which the display device is located outside the vehicle.

The driver sensor 200 may be implemented by a camera, a line-of-sight sensor, a motion sensor, or any other sensing device. This driver sensor 200 may measure movements of the driver's arms and head, a direction of his/her line of sight, and any other parameters related to the driver. In an example implementation where the driver sensor 200 is a camera, the driver sensor 200 may acquire the movements of the arms and head, the direction of the line of sight, and any other parameters by subjecting an image captured by the camera to image processing. In another example implementation where the driver sensor 200 is a line-of-sight sensor, the driver sensor 200 may detect the line of sight by using a corneal reflection method or any other similar method. The seating sensors 300 may be provided in the respective seats of the vehicle, and each of the seating sensors 300 may determine whether a person sits on a corresponding seat. The speakers 600 may emit a warning sound to the inside and outside of the vehicle when the HUD device 500 displays a warning to persons inside and outside of the vehicle. The seat vibrators 610 may be provided in the respective seats inside the vehicle. In addition, each of the seat vibrators 610 may vibrate a corresponding seat to give a warning to the driver and occupants when the HUD device 500 displays a warning inside the vehicle.

The controller 400 may control the displaying of the HUD device 500 on the basis of the information detected by the vehicle-exterior sensors 100, the driver sensor 200, and other sensors. The controller 400 may include an environment information acquiring unit 402, a driver information acquiring unit 404, a driver state determiner 406, an environment state determiner 407, a blind spot region estimating unit 408, a shift position determiner 410, and an HUD controller 414. In one implementation, the HUD controller 414 may serve as a "display controller". Each of the components of the controller 400 may be implemented in hardware or in software. In an example implementation where one component of the controller 400 is implemented in hardware, this component may be circuitry. In another example implementation where one component of the controller 400 is implemented in software, this component may be a program that causes a central processing unit (CPU) or other processor to perform its function.

The environment information acquiring unit 402 may acquire information on a distance to a target object, which is called distance information. In an example implementation, the environment information acquiring unit 402 may generate the distance information, on the basis of an amount of shift between corresponding locations in a pair of right and left stereo images and by means of principle of triangulation. The pair of right and left stereo images may be captured by a set of right and left cameras of the stereo camera which constitute the vehicle-exterior sensor 100 in one implementation. Together with the acquisition of the distance information, the environment information acquiring unit 402 may also acquire, from information on the image, positional information on the object. Further, the environment information acquiring unit 402 may perform a known grouping process on the distance information generated by the principle of triangulation. The environment information acquiring unit 402 may obtain data on a three-dimensional object, a lane line, etc., by comparing the distance information subjected to the grouping process with preset three-dimensional data such as, but not limited to, three-dimensional object data. By performing the processes in this manner, the controller 400 is also able to recognize various entities, including a person, another vehicle, a stop sign, a stop line, and an electronic toll collection (ETC) gate.

On the basis of the information on the distance to a factor generated by the principle of triangulation, the environment information acquiring unit 402 may also calculate a variation in the distance to the factor and/or a speed relative to the factor. Non-limiting examples of the factor may include a person and another vehicle. The variation in the distance may be determined by integrating distances to the factor in frame images. The frame images may be acquired at regular time intervals. The relative speed may be determined by dividing the distances acquired at regular time intervals by the unit time.

In the above manner, the environment information acquiring unit 402 may acquire the image information regarding an environment outside the vehicle, from the vehicle-exterior sensors 100. Further, the environment information acquiring unit 402 may analyze the acquired image information through an image analyzing process. As a result of analyzing the image information, the environment information acquiring unit 402 may acquire environment information regarding the environment outside the vehicle 800.

Figure 3:
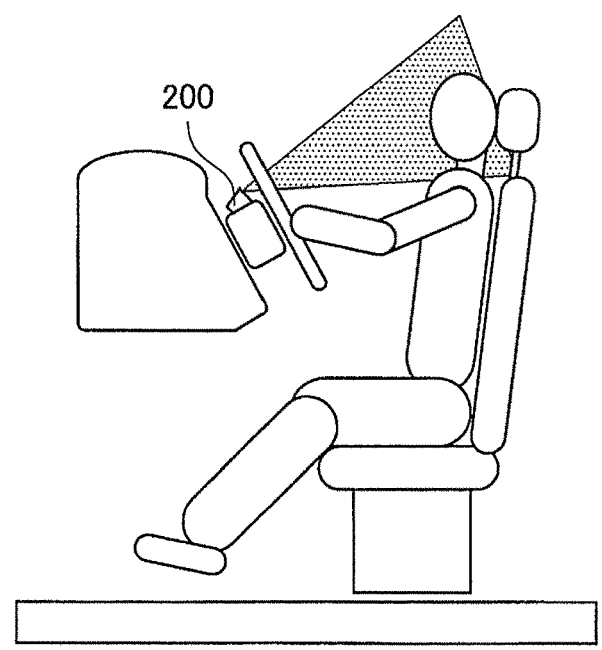
FIG. 3 schematically illustrates an example of a state where a driver sensor captures an image of a driver.

FIG. 3 schematically illustrates an example of a state where the driver sensor 200 captures an image of the driver if the driver sensor 200 is implemented by a camera. As illustrated in FIG. 3, as an example, the driver sensor 200 may be mounted on an upper portion of a steering column.

In an example implementation where the driver sensor 200 is a camera, the image captured by the driver sensor 200 may be supplied to the controller 400. Then, the driver information acquiring unit 404 may acquire a driver's face region from the received image through an image processing technique such as, but not limited to, an edge and face detection technique. The driver information acquiring unit 404 thereby may acquire an orientation of the face on the basis of the face region. The driver state determiner 406 may determine whether the driver looks aside, on the basis of the face orientation. Moreover, the driver information acquiring unit 404 may obtain information on locations of feature points of predetermined parts of the face, which is called location information. Non-limiting examples of the predetermined parts of the face may include the eyes, the nose, and the mouth. On the basis of this location information, then, the driver state determiner 406 may determine a driver's state. As an example, the driver state determiner 406 may estimate whether the driver is sleepy, whether the driver is sleeping, or whether the driver is looking ahead without due care.

In one specific but non-limiting implementation, the driver information acquiring unit 404 may acquire the orientation of the driver's face, on the basis of the driver's face region obtained from the image information. In this case, the driver's face region may be defined from the location information on the feature points of the parts, including the eyes, the nose, and the mouth, of the face. In order to estimate the face orientation, as an example, the driver state determiner 406 may use, as a reference, a distance between the eyes as seen from the front and then may compare this reference with a distance between the eyes obtained from the image information. It may be determined that, as the distance between the eyes obtained from the image information becomes smaller than the reference, the face is oriented sideways more largely as seen from the front.

The environment state determiner 407 in the controller 400 determines information on an environment outside the vehicle, on the basis of the environment information acquired by the environment information acquiring unit 402. More specifically, the environment state determiner 407 may set a person outside the vehicle to a target and determine a state of this target person. Further, the environment state determiner 407 may determine whether the person enters a driver's blind spot. As will be described later, the blind spot region estimating unit 408 may estimate blind spot regions R on the basis of an eye point EP of the driver and vehicle data that indicates locations of structures 870.

The HUD controller 414 may control the displaying of the HUD device 500. More specifically, the HUD controller 414 may control the displaying of the HUD device 500, on the basis of the determination results of the driver state determiner 406 and the environment state determiner 407.

In one implementation, the vehicle-exterior sensor 100 detects the presence of a person around the vehicle. When the detected person enters a driver's blind spot, the HUD device 500 may provide the person that has entered the blind spot with a display toward the outside of the vehicle, thereby informing the person of the entry into the blind spot. As a result, the person is able to recognize that he/she has entered the blind spot and is expected to pay more attention to the movement of the vehicle.

In order to encourage the driver to pay more attention, the HUD device 500 may also display the location of the person at the blind spot and the direction to this person, toward the inside of the vehicle. As a result, the driver is able to recognize the location of and direction to the person at the blind spot and is expected to drive with more attention to the person at the blind spot.

When the vehicle moves backward, the HUD device 500 may display, on the rear window, a locus of the vehicle and a warning that a person or any obstacle such as, but not limited to, another vehicle comes close to the vehicle relatively. In one example implementation, the locus is referred to as the back guide; the warning is referred to as the sonar display. Providing these displays allows the driver to check his/her surroundings less carefully.

Figure 4:
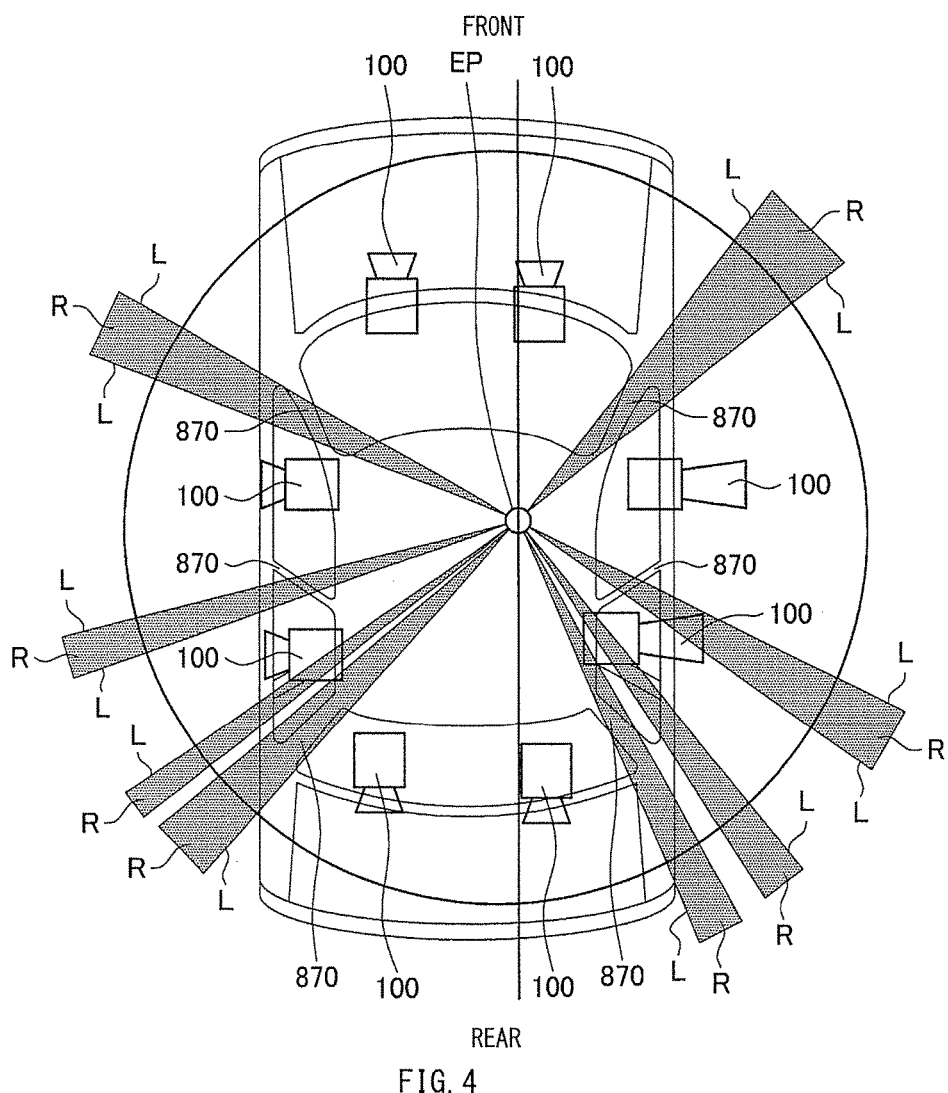
FIG. 4 schematically illustrates driver's blind spot regions.

FIG. 4 schematically illustrates the blind spot regions R. First, the driver information acquiring unit 404 may acquire a location of the driver's eyes on the basis of the image information acquired from the driver sensor 200. The location acquired in this manner is referred to as the eye point EP. In an example implementation where the driver sensor 200 is a stereo camera, the driver sensor 200 may be able to acquire the eye point EP more accurately. In this case, the eye point EP may be a fixed value, which is equal to the average of some estimated values. By determining the eye point EP of the driver, it may be possible to estimate the blind spot regions R from vehicle data acquired in advance, as illustrated in FIG. 4.

More specifically, the vehicle data may contain locations of the structures 870 of the vehicle 800, as illustrated in FIG. 4. In one example implementation, the structures 870 may include pillars and window frames. As seen from FIG. 4, each blind spot region R may be determined by connecting the eye point EP and the outlines of a corresponding structure 870 with straight lines L. The blind spot regions R may be estimated by the blind spot region estimating unit 408.

Meanwhile, the environment information acquiring unit 402 acquires a location of a person around the vehicle, on the basis of the image information obtained from the vehicle-exterior sensor 100. Then, the environment state determiner 407 determines whether the person overlaps any of the blind spot regions R. When the person overlaps one of the blind spot regions R, the environment state determiner 407 determines that the person has entered the driver's blind spot.

Figure 5:
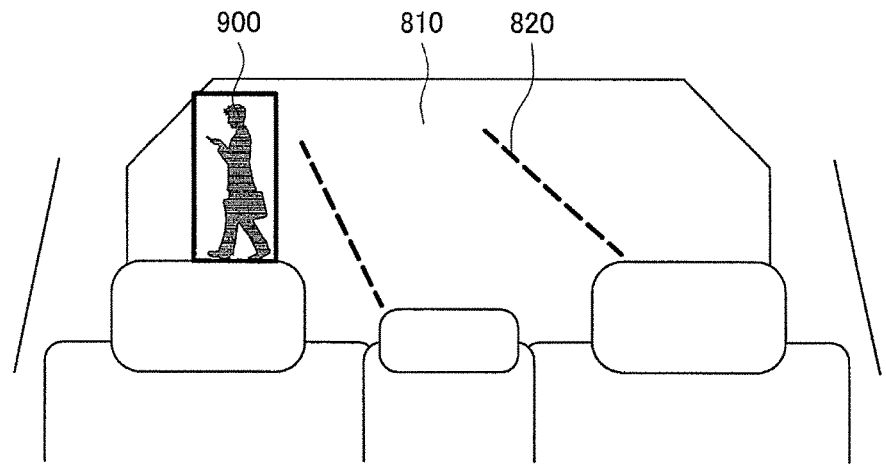
FIG. 5 schematically illustrates an example of a display provided by the HUD device.
Figure 6:
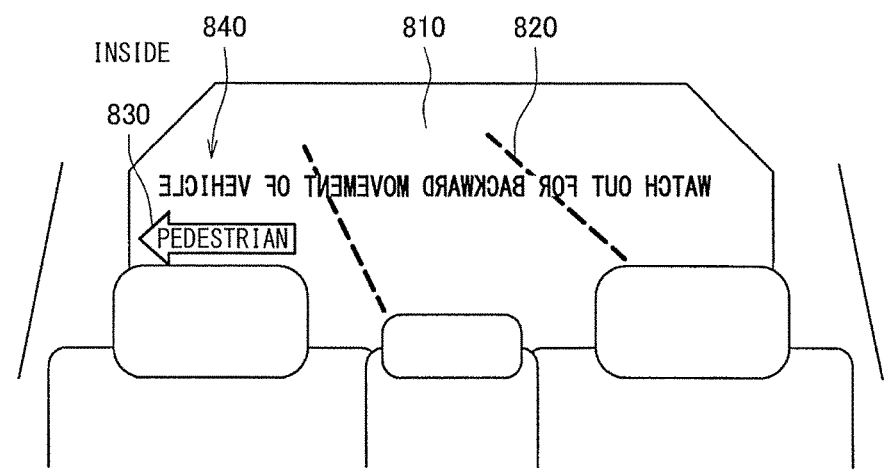
FIG. 6 schematically illustrates another example of the display provided by the HUD device.
Figure 7:
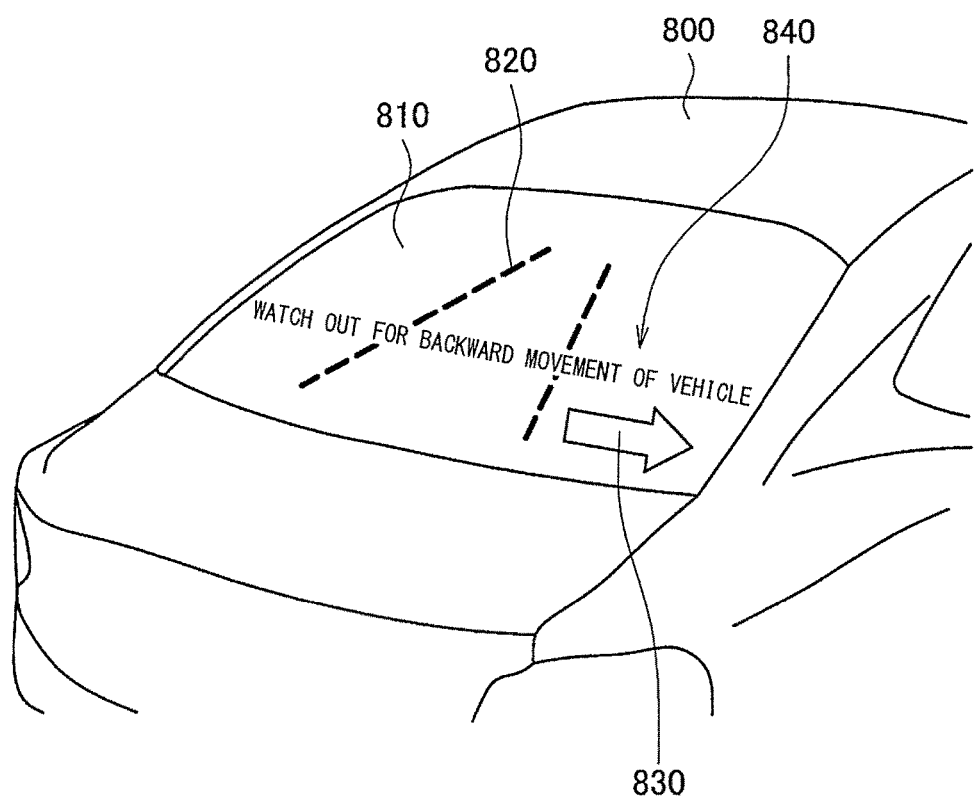
FIG. 7 schematically illustrates still another example of the display provided by the HUD device.

FIGS. 5 to 7 each schematically illustrate an example of a display provided by the HUD device 500. In one example implementation, a description is given regarding the case where a vehicle 800 is moving backward. The determination whether the vehicle 800 is moving backward may be made by the shift position determiner 410 on the basis of a value detected by the shift position sensor 620.

FIG. 5 schematically illustrates an example of a rear window 810 as seen from a driver seat and a passenger seat in the vehicle 800. As illustrated in FIG. 5, a person 900 walking outside the vehicle may be viewable from the inside of the vehicle through the rear window 810. This person 900 may be walking toward a blind spot region R behind the vehicle 800. Further, a back guide 820 may be displayed on the rear window 810 as the locus. So that the back guide 820 is displayed, the HUD controller 414 may control the displaying of the HUD device 500 on the basis of a steering angle of a steering wheel detected by the steering angle sensor 630.

FIG. 6 schematically illustrates an example of a state where the person 900 that has been in the state of FIG. 5 enters a blind spot region R. As illustrated in FIG. 6, when the person 900 enters a blind spot, the HUD device 500 may display an indication 830 on the rear window 810 toward the inside of the vehicle in order to arouse attention. In the indication 830, the arrow may indicate that a pedestrian is present at a blind spot and a location of this pedestrian. In this case, the HUD device 500 may explicitly indicate the presence of the pedestrian at the blind spot, for example by displaying a message saying "PEDESTRIAN AT BLIND SPOT!".

FIG. 7 schematically illustrates an example of the state of FIG. 6 as seen from the outside of the vehicle 800. As illustrated in FIG. 7, an indication 840 that contains a message saying "WATCH OUT FOR BACKWARD MOVEMENT OF VEHICLE" is displayed on the rear window 810 of the vehicle 800. This indication 840 is used to encourage the person 900 at the blind spot to pay more attention. In this case, in addition to the indication 840, the back guide 820 and the indication 830 that arouse attention inside the vehicle 800 may be displayed on the rear window 810.

As a result of the above, the driver and occupants inside the vehicle 800 may recognize the presence of the person 900 at the blind spot by viewing the indication 830 displayed toward the inside of the vehicle 800. The driver may also view the indication 830 through the rearview mirror. The indication 830 that indicates the location of the person 900 by using the arrow may encourage the driver to swivel the vehicle 800 more carefully, especially in the direction indicated by the arrow. As a result, the driver is expected to move the vehicle 800 backward while taking the presence of the person 900 at the blind spot into account.

Furthermore, by viewing the indication 840 displayed toward the outside of the vehicle, the person 900 at the blind spot is expected to pay more attention to the backward movement of the vehicle 800. In addition, when displaying the indication 840 toward the outside of the vehicle, the HUD device 500 may display a message, such as that saying "YOU ENTERED DRIVER'S BLIND SPOT". This enables the person 900 at the blind spot to recognize that he/she has entered the blind spot. As a result, the person 900 is expected to pay more attention to the backward movement of the vehicle 800 and to reliably avoid a concern, such as coming into contact with the vehicle 800.

Furthermore, by following the back guide 820 displayed on the rear window 810, the driver is able to move the vehicle 800 to a desired site.

Figure 8:
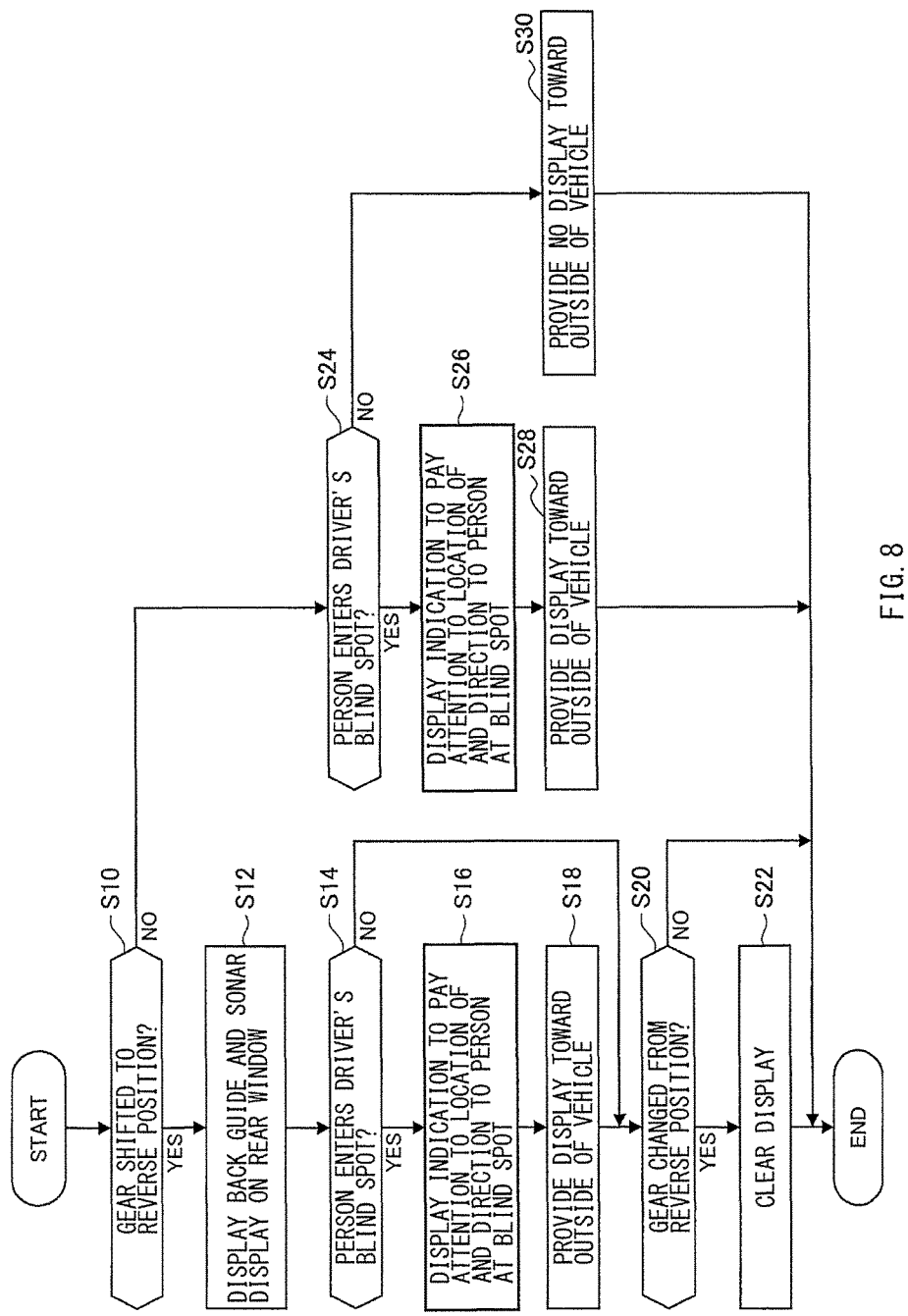
FIG. 8 is a flowchart illustrating an example of a process performed by the vehicle display system.

Next, a description is given of an example of a process performed by the vehicle display system 1000 according to one implementation, with reference to a flowchart of FIG. 8. The process of FIG. 8 is performed by the components of the controller 400 and is repeated during predetermined control periods. In step S10, the shift position determiner 410 may determine whether a shift lever is placed in the reverse position, in other words, whether a gear is shifted to the reverse position. When the shift lever is placed at the reverse position (S10: YES), the flow may proceed to step S12. In step S12, the HUD device 500 may display the back guide 820 and the sonar display on the rear window 810.

In step S14, the environment state determiner 407 may determine whether the person 900 enters a driver's blind spot. When the person 900 enters a driver's blind spot, the flow may proceed to step S16. In step S16, the HUD device 500 may display the indication 830 toward the inside of the vehicle which indicates a location of and direction to the person 900 at the blind spot. In step S18, thereafter, the HUD device 500 may display the indication 840 that encourages the person 900 outside the vehicle 800 to pay more attention.

In step S20, the shift position determiner 410 may determine whether the shift lever is changed from the reverse position. When the shift lever is changed from the reverse position (S20: YES), the flow may proceed to step S22. In step S22, the HUD device 500 may clear the display on the rear window 810. After step S22, the process may be concluded (END). When the shift lever is not changed from the reverse position in step S20 (S20: NO), the HUD device 500 may maintain the display on the rear window 810, and the process in the current control period may be concluded (END).

When the shift lever is not placed at the reverse position (S10: NO), the flow may proceed to step S24. However, even when the shift lever is not placed at the reverse position (S10: NO), as long as the person 900 is at a driver's blind spot, the process similar to the process performed when the shift lever is placed at the reverse position may be performed. In step S24, the environment state determiner 407 may determine whether the person 900 enters a driver's blind spot. When the person 900 enters a driver's blind spot (S24: YES), the flow may proceed to step S26. In step S26, the HUD device 500 may display the indication 830 on the window of the vehicle 800 toward the inside of the vehicle which indicates a location of and direction to the person 900 at the blind spot. In this case, the indication 830 may be displayed on the windshield or a side window, because the shift lever is not placed at the reverse position and thus the vehicle does not move backward. In step S28, thereafter, the HUD device 500 may display, on the window of the vehicle 800, the indication 840 that encourages the person 900 outside the vehicle 800 to pay more attention. In this way, when the shift lever is not placed at the reverse position, the HUD device 500 may display the indication 840 at any suitable site such as, but not limited to, on the windshield, a side glass, or the rear window 810, depending on the location of the person 900 and a moving direction of the vehicle 800, and any other factors.

When the person 900 does not enter any of the driver's blind spots (S24: NO), the flow may proceed to step S30. In step S30, the HUD device 500 may provide no displays toward the outside of the vehicle. After step S28 or S30, the process may be concluded in the current control process (END).

According to one implementation, as described above, the vehicle display system 1000 is able to display a warning to a person who has entered a driver's blind spot. More specifically, when the person 900 outside the vehicle 800 enters a driver's blind spot, the vehicle display system 1000 displays a warning to the person 900 on the rear window 810 of the vehicle 800. In this way, the vehicle display system 1000 encourages the person 900 outside the vehicle to pay more attention. In addition, when the person 900 outside the vehicle 800 enters a driver's blind spot, the vehicle display system 1000 displays a warning to the driver on the rear window 810 of the vehicle 800. In this way, the vehicle display system 1000 encourages the driver to pay more attention.

The controller 400 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 400. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 400 illustrated in FIG. 1.

Although some implementations of the technology have been described in the foregoing with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle display system comprising:
a display device mounted on a vehicle;
a backward movement determiner configured to determine whether the vehicle moves backward;
a determiner configured to determine, when the vehicle moves backward, whether a person present outside the vehicle enters a blind spot of a driver of the vehicle, the blind spot being in a rear side of the vehicle; and
a display controller configured to control, when the person enters the rear blind spot, the display device to display a first warning on a rear window of the vehicle, the first warning being displayed towards the person outside the vehicle.

2. The vehicle display system according to claim 1, wherein, when the person enters the blind spot, the display controller controls the display device to inform the person of an entry into the blind spot.

3. The vehicle display system according to claim 2, wherein the display controller controls the display device to display, on the rear window, one or both of a back guide and a message, the message indicating that the person comes close to the vehicle.

4. The vehicle display system according to claim 1, wherein, when the person enters the blind spot, the display controller controls the display device to display a second warning to the driver, the second warning being different from the first warning.

5. The vehicle display system according to claim 4, wherein the display controller controls the display device to display, on the rear window, one or both of a back guide and a message, the message indicating that the person comes close to the vehicle.

6. The vehicle display system according to claim 1, wherein the display controller controls the display device to display, on the rear window, one or both of a back guide and a message, the message indicating that the person comes close to the vehicle.

7. The vehicle display system according to claim 1, wherein the display controller is further configured to control, when the person enters the blind spot, the display device to display, on the rear window of the vehicle, an arrow indicating that the person is present at the blind spot and a location of the person.

8. A method of controlling a vehicle display system, the method comprising:
determining whether a vehicle moves backward;
determining, when the vehicle moves backward, whether a person present outside the vehicle enters a blind spot of a driver of the vehicle, the blind spot being in a rear side of the vehicle; and
controlling, when the person enters the blind spot, a display device of the vehicle to display a warning on a rear window of the vehicle, the warning being displayed towards the person outside the vehicle.

9. The method according to claim 8, further comprising:
controlling, when the person enters the blind spot, the display device to display, on the rear window of the vehicle, an arrow indicating that the person is present at the blind spot and a location of the person.

10. A vehicle display system comprising:
a display device mounted on a vehicle; and
circuitry configured to
determine whether the vehicle moves backward,
determine, when the vehicle moves backward, whether a person present outside the vehicle enters a blind spot of a driver of the vehicle, the blind spot being in a rear side of the vehicle, and
control, when the person enters the blind spot, the display device to display a warning on, a rear window of the vehicle, the warning being displayed towards the person outside the vehicle.

11. The vehicle display system according to claim 10, wherein the circuitry is further configured to configured to control, when the person enters the blind spot, the display device to display, on the rear window of the vehicle, an arrow indicating that the person is present at the blind spot and a location of the person.

* * * * *